(12) United States Patent
DeLuca et al.

(10) Patent No.: US 9,100,784 B2
(45) Date of Patent: Aug. 4, 2015

(54) LOCATION-BASED CONFERENCE CALL DIAL-IN NUMBER RETRIEVAL AND INCLUSION

(71) Applicant: International Business Machines Corporation, Armonk, NY (US)

(72) Inventors: Lisa Seacat DeLuca, Baltimore, MD (US); Lydia M. Do, Raleigh, NC (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 13/924,870

(22) Filed: Jun. 24, 2013

(65) Prior Publication Data

US 2014/0378108 A1    Dec. 25, 2014

(51) Int. Cl.
*H04M 7/00* (2006.01)
*H04M 3/42* (2006.01)
*H04W 4/02* (2009.01)
*H04M 3/56* (2006.01)

(52) U.S. Cl.
CPC ............. *H04W 4/02* (2013.01); *H04M 3/565* (2013.01); *H04M 3/42348* (2013.01); *H04M 3/562* (2013.01)

(58) Field of Classification Search
CPC ....... H04M 3/56; H04M 3/568; H04M 3/563; H04M 3/564; H04M 2250/62; H04M 2207/18; H04L 12/1818
USPC ...................... 379/202.01; 455/416
See application file for complete search history.

(56) References Cited

U.S. PATENT DOCUMENTS

| | | | |
|---|---|---|---|
| 7,277,697 B2 | 10/2007 | Desai et al. | |
| 7,492,730 B2 | 2/2009 | Eshel et al. | |
| 2001/0002927 A1 | 6/2001 | Detampel, Jr. et al. | |
| 2008/0112338 A1 | 5/2008 | Acharya et al. | |
| 2009/0253420 A1 | 10/2009 | Stewart et al. | |
| 2011/0130131 A1 | 6/2011 | Hanson et al. | |
| 2011/0150194 A1 | 6/2011 | Narayanaswamy | |
| 2011/0271207 A1 | 11/2011 | Jones et al. | |
| 2012/0039456 A1* | 2/2012 | Conner et al. | 379/201.11 |
| 2012/0321060 A1* | 12/2012 | Lucey et al. | 379/93.21 |

OTHER PUBLICATIONS

IBM and Cromer, et al., "Automatic Laptop Reconfiguration Based on Location", An IP.com Prior Art Database Technical Disclosure, Original Publication Date: May 1, 1999, Original Disclosure Info: RD v42 n421 05-99 article 421139, IP.com No. IPCOM000123841D, IP.com Electronic Publication: Apr. 5, 2005.

* cited by examiner

*Primary Examiner* — Rasha Al Aubaidi
(74) *Attorney, Agent, or Firm* — Olivia R. Scheuer; Ian A. McKee (57) ABSTRACT

A dial-in number is provided to a participant of a conference call. A computer identifies a participant of a conference call, and attempts to determine the location of the participant. Responsive to determining the location of the participant, the computer determines a location-based dial-in number for the participant and transmits the determined location-based dial-in number to the participant. Responsive to failing to determine the location of the participant, the computer determines an alternative dial-in number for the participant and transmits the determined alternative dial-in number to the participant. The computer can determine the location of the participant based on attributes derived from a location service enabled application or device associated with the participant.

17 Claims, 3 Drawing Sheets

LOCATION-BASED CONFERENCE CALL DIAL-IN NUMBER RETRIEVAL AND INCLUSION

FIELD OF THE INVENTION

The present invention relates generally to the field of conference calling, and more particularly to retrieving a conference call dial-in number for a conference invitee based on the location of the conference invitee.

BACKGROUND OF THE INVENTION

The use of virtual meetings of many types has increased greatly, given the recent proliferation of communication technologies, and given the relatively higher costs of conducting in-person meetings. Typically virtual meetings, which can include group chat rooms, webinars, conference calls, and the like, are assemblies of individuals for a business or social purpose conducted using a communication medium such as the Internet, a phone network, or another network. Conference calls can be used for personnel training, presentations, or for business organization, for example. During a conference call, each participant can use his or her own computer or telephone to be connected to all other participants via the network, and can participate in the sharing and exchange of audio information, video information, or both. Sharing and exchange of information can be facilitated with techniques such as virtual whiteboarding, shared work spaces, slideshow presentations, streaming video, web tours, meeting recording capabilities, simultaneous text chat, polling, surveys, screen sharing, desktop sharing, and application sharing. In many instances, a conference call is provided, hosted, or managed by a server computer.

A conference call is usually scheduled in advance by an individual who invites additional people to participate in the conference call. Such invitations are typically facilitated by an electronic calendaring and invitation system. Each invitation, which may be transmitted by email or other electronic notice, can include a specific date and time for the conference call, as well as a generic call-in number.

SUMMARY

Embodiments of the present invention provide for a program product, system, and method in which a dial-in number is provided to a participant of a conference call. A computer identifies a participant of a conference call, and attempts to determine the location of the participant. Responsive to determining the location of the participant, the computer determines a location-based dial-in number for the participant and transmits the determined location-based dial-in number to the participant. Responsive to failing to determine the location of the participant, the computer determines an alternative dial-in number for the participant and transmits the determined alternative dial-in number to the participant. The computer can determine the location of the participant based on attributes derived from a location service enabled application or device associated with the participant.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

Figure 1:
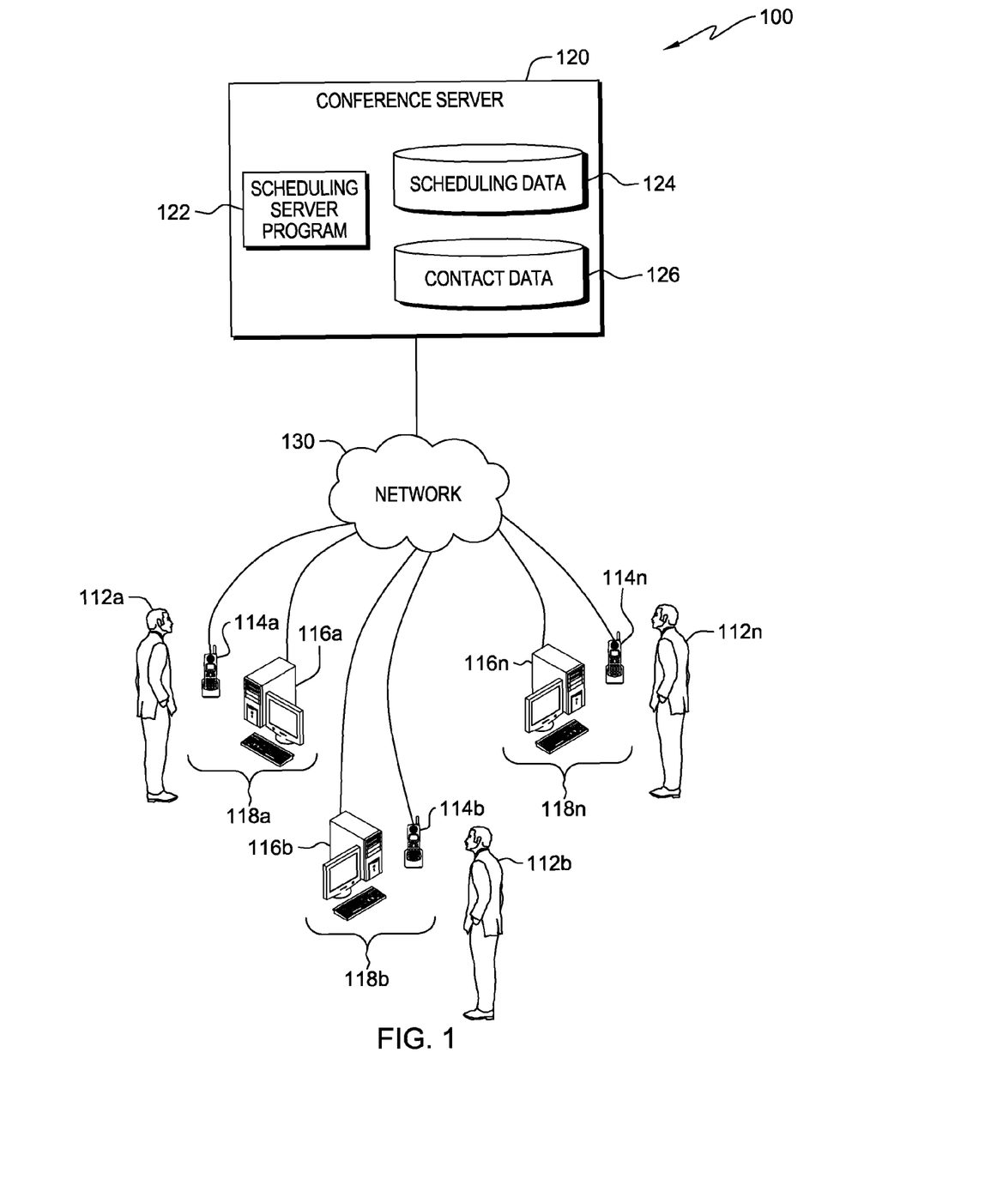
FIG. 1 is a block diagram of a conference calling system in accordance with one embodiment of the present invention.

FIG. 1 depicts a diagram of conference call system 100 in accordance with an illustrative embodiment of the present invention. FIG. 1 provides only an illustration of one embodiment and does not imply any limitations with regard to the environments in which different embodiments may be implemented.

Conference call system 100 includes conference server 120; network 130; telephones 114a, 114b, and 114n; and computers 116a, 116b, and 116n. Each pairing of a telephone 114 and a computer 116 is regarded as a conference call endpoint 118. Conference call endpoints 118a through 118n are each operable by a respective person 112. Telephones 114a through 114n includes any number of n telephones, and computers 116a through 116n includes any number of n computers, where n is an integer greater than one. In some embodiments, however, the number of computers 116 is different than the number of telephones 114. As such, although FIG. 1 depicts each conference call endpoint 118 as including a pairing of a telephone 114 and a computer 116, in other embodiments, a conference call endpoint 118 may include only a telephone 114 or only a computer 116. In general, conference server 120, each of telephones 114a through 114n, and each of computers 116a through 116n can be any programmable electronic device as described in further detail below with respect to FIG. 3.

Network 130 provides connectivity among conference call endpoints 118a through 118n and conference server 120 by enabling the transport and control of communications signals before and during a conference call. The communications signals convey digital media or analog media, such as audio media and video media, for example. Toward this end, network 130 can include one or more interconnected data-processing systems such as switches, servers, routers, gateways, private-branch exchanges, and conference call bridges. In one embodiment, one or more of conference call endpoints 118a through 118n may be tied to a private branch exchange of network 130. In one embodiment, one or more of conference call endpoints 118a through 118n may interact via common audio channels, common media channels, or both, managed by conference server 120 via network 130. Network 130 can include or utilize the Internet, and can utilize wired or wireless communications techniques. In general, network 130 can be any combination of connections and protocols that will support communications between conference server 120 and one or more of conference call endpoints 118a through 118n in accordance with embodiments of the present invention.

Each of conference call endpoints 118a through 118n can include a cellular phone, a conference phone, a speaker phone, a desk set, a computer with a resident software phone, or any other type of telecommunication device that can exchange voice signals. Conference call endpoints 118a through 118n are each able to transmit and receive voice signals to and from (i.e., are each able to call and be called by) the rest of conference call endpoints 118a through 118n. For example, telephones 114a through 114n are each able to call, or be called by, the rest of telephones 114a through 114n. Further, each of conference call endpoints 118a through 118n can include a personal computer, a laptop, a personal digital assistant, a thin client, or any other type of computer that can exchange and process data. In various embodiments, the entire functionality of a conference call endpoint 118 can be implemented in multiple devices or in one device. In the latter case, the entire functionality of a conference call endpoint 118 might be implemented solely in its telephone 114, or solely in its computer 116, for example.

Computers 116a through 116n each include a scheduling client program that is interoperable with scheduling server program 122 of conference server 120 at least for the purpose of scheduling conference calls. For example, in one embodiment computer 116a includes a scheduling client program that person 112a can use to select a date and time for a conference call, and to prompt scheduling server program 122 to prepare invitations to persons 112b through 112n to inform them of the conference call and request their participation. Each scheduling client program of a computer 116 can integrate with a calendar program, to provide a respective person 112 with a calendar view of scheduled conference calls. Person 112a can further use the scheduling client program of computer 116a to reschedule the conference call, to invite new participants to the conference call, to revoke the invitations of participants from the conference call, or to cancel the conference call, for example. Further, copies of the scheduling client program can be included in computers 116b through 116n that allow persons 112b through 112n, respectively, to counter, reschedule or otherwise modify the scheduled conference call. In one embodiment, the scheduling client program is provided or installed independently of conference server 120, while in another embodiment the scheduling client program is provided by conference server 120 to computers 116a through 116n via a web interface, for example. In one embodiment, conference server 120 can itself send and manage invitations.

Conference server 120 includes scheduling server program 122, scheduling data 124, and contact data 126. Scheduling data 124 includes a conference call record for each scheduled conference call. Each conference call record includes the date and time for the conference call, the host who set up the conference call (e.g., person 112a at conference call endpoint 118a, etc.), the invitees that the host invited to the conference call (e.g., persons 112b through 112n, etc.), and selected dial-in numbers for each participant (i.e., the host and all of the invitees).

Contact data 126 can include suitable location-based dial-in numbers indexed by various data, in various embodiments. Generally, the suitability of a location-based dial-in number is determined by the number's accessibility and functionality at a particular location. For instance, contact data 126 can include suitable location-based dial-in numbers indexed by each potential participant. In particular, contact data 126 can include a location-based dial-in number, suitable for the known or expected location of each of persons 112a through 112n, indexed to each of persons 112a through 112n, or suitable for the known or expected location of each of conference call endpoints 118a through 118n, indexed to each of conference call endpoints 118a through 118n. For example, contact data 126 can include a location-based dial-in number, suitable for the workplace of person 112b, indexed to person 112b, or can include a location-based dial-in number, suitable for the area or zip code of conference call endpoint 118b, indexed to conference call endpoint 118b.

Further, contact data 126 can also include suitable location-based dial-in numbers indexed by each potential location. In particular, contact data 126 can include a location-based dial-in number indexed to potential locations that participants may dial in to a conference call from. For example, if conference call server 120 handles, via scheduling server program 122, conference calling for a geographic area within which persons 112a through 112n and conference call endpoints 118a through 118n are dispersed, then contact data 126 can include location-based dial-in numbers indexed to appropriate sub-regions of the geographic area.

Scheduling server program 122 can receive a conference call prompt from the scheduling client program of one of computers 116a through 116n, and generate and transmit invitations to the appropriate other ones of computers 116a through 116n (i.e., can receive a prompt from a host, and transmit invitations to each invitee). For example, scheduling server program 122 can receive a conference call prompt from computer 116a, and generate and transmit invitations to computers 116b through 116n. Based on the conference call prompt, scheduling server program 122 can establish a conference call record for the conference call in scheduling data 124. Further, scheduling server program 122 can generate invitations by retrieving suitable location-based dial-in numbers from contact data 126, and by including the location-based dial-in numbers in the invitations, based on the locations of the participants, as discussed in detail below. Scheduling server program 122 can highlight, bold, isolate, or otherwise style the retrieved suitable location-based dial-in number in an invitation to call it to the participant's attention.

In particular, upon receiving a conference call prompt, scheduling server program 122 can attempt to determine the location of each participant based on, for example, attributes derived from a location service enabled application or device associated with the participant. Applications and devices can be set for location service monitoring to determine a participant's location (i.e., current location). For example, scheduling server program 122 can determine a location of a participant based on the email address of the participant, on an LDAP lookup of the participant, on the GPS location of a GPS device carried by the participant, on the HTML5 browser-based location reported by a browser of the participant, on cellular tower triangulation of a cellular phone of the participant, on the area code of the office or work phone number of the participant, on a personnel or employee record of the participant, or on another basis (i.e., can determine the participant's current location). Further, scheduling server program 122 can determine an expected location of a participant based on other scheduled events on the participant's calendar on or around the date and time for the conference call, or based on the participant's online reservations for travel on or around the date and time for the conference call (i.e., can determine the participant's future location). The participant's expected location can be determined, for example, for any time in a window of time ending at the time of the scheduled conference call (e.g., a window of time starting one hour prior to the conference call and ending at the start time of the conference call, etc.), or determined for a time just prior to the scheduled conference call (e.g., one minute prior to the scheduled conference call, etc.). For example, if the participant's calendar on the day of the conference call has an in-person meeting scheduled in a particular country, then scheduling server program 122 can determine that the participant will be in the country during the conference call, regardless of the participant's location at the time the determination is made (i.e., regardless of the participant's current location when scheduling server program 122 receives the conference call prompt).

Further, in one embodiment scheduling server program 122 can attempt to re-determine the location of each participant after receiving a conference call prompt, on any basis described above, to update scheduling data 124, and each participant, with suitable location-based dial-in numbers. Such redetermination can occur periodically, can occur one or more times during a window of time ending at the time of the scheduled conference call (e.g., during a window of time starting two hours prior to the conference call and ending at the start time of the conference call, etc.), or can occur just prior to the scheduled conference call (e.g., 30 seconds prior to the scheduled conference call, etc.), for example. In one embodiment, scheduling server program 122 can re-determine the location of each participant in real time. Further, in one embodiment scheduling server program 122 can update or retransmit an updated invitation, including a new suitable location-based dial-in number, to a participant if the participant's current location changes or if the participant's expected future location changes.

If scheduling server program 122 can determine the location of a participant, then scheduling server program 122 looks up in contact data 126 a suitable location-based dial-in number for the participant, indexed by location, based on the location, and inserts the number into the invitation to be transmitted to the participant. For example, if scheduling server program 122 determines the GPS location of a participant, and contact data 126 includes a sub-region of a geographic area in which the determined GPS location lies, then scheduling server program 122 can look up in contact data 126 the location-based dial-in number indexed to the sub-region. However, if scheduling server program 122 cannot determine the location of a participant, then scheduling server program 122 inserts an appropriate alternative call-in number, such as the location-based dial-in number for the participant, indexed by participant, in contact data 126, or such as a toll-based number that will function regardless of the participant's location. For example, if scheduling server program 122 cannot determine the GPS location of a participant, or otherwise determine the location of the participant, then contact data 126 may nevertheless include a location-based dial-in number indexed to the participant. In one embodiment, if scheduling server program 122 cannot determine the location of a participant, then scheduling server program 122 notifies one or both of the participant and the host of the conference call.

In one embodiment, scheduling server program 122 can validate the dial-in numbers stored in a conference call record just prior to the record's scheduled conference call. As stated above, each conference call record in scheduling data 124 includes the date and time for the conference call and the selected dial-in numbers for each participant. As such, at a predefined time ahead of the beginning of a conference call (e.g., 30 minutes prior to the conference call, etc.), scheduling server program 122 can validate some or all of the dial-in numbers stored in the conference call record by, e.g., dialing them to test for accessibility and functionality at a particular location. In one embodiment, scheduling server program 122 can validate a dial-in number by dialing it from the location of conference server 120. In another embodiment, scheduling server program 122 can validate a dial-in number by dialing it from the location of the conference call endpoint 118 of the participant. Scheduling server program 122 can achieve this by, for example, connecting to the scheduling client program of a conference call endpoint 118 and validating via the connected scheduling client program.

In one embodiment, scheduling server program 122 can report the determined locations of the participants to the host of the conference call. For example, if person 112a invited persons 112b through 112n to a conference call, then scheduling server program 122 can report the determined locations of persons 112b through 112n to person 112a. Having received this reported information, the host of the conference call can take corrective action if the determined locations have required that high-cost suitable location-based dial-in numbers be provided to one or more of the participants. For example, if several of the participants are in a sub-regions of a geographic area accessible only by a high-cost location-based dial-in number, the host of the conference call can take corrective action by cancelling or rescheduling the conference call to reduce costs, for example.

Figure 2:
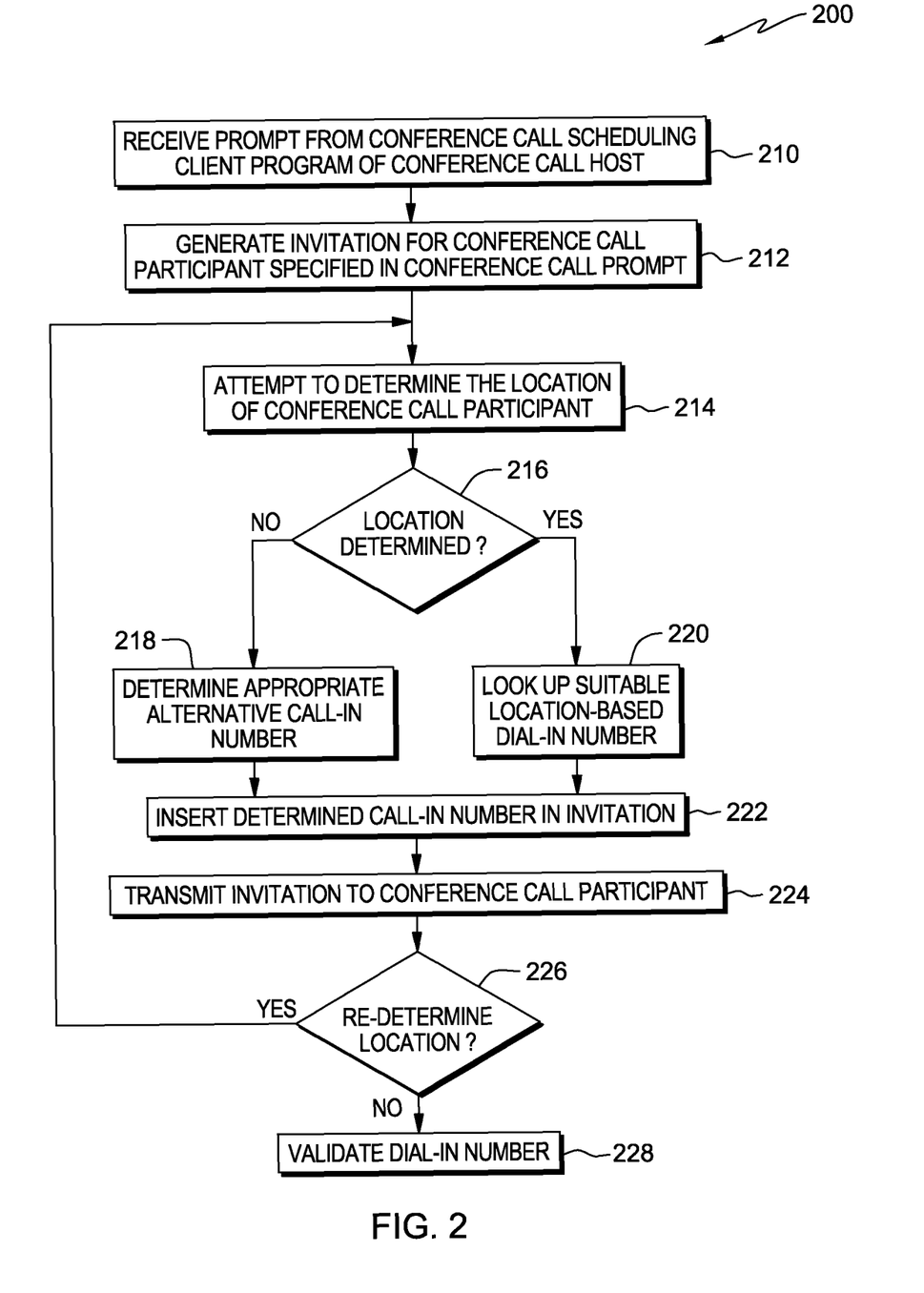
FIG. 2 is a flowchart depicting steps followed by a scheduling server program in accordance with an embodiment of the present invention.

Referring now to FIG. 2, flowchart 200 depicting steps followed by scheduling server program 122 in accordance with an embodiment of the present invention is shown. In step 210, scheduling server program 122 receives a prompt from a scheduling client program of a conference call host. For example, scheduling server program 122 can receive a prompt from the scheduling client program of computer 116a operated by person 112a, inviting persons 112b through 112n to a conference call. As such, all of persons 112a through 112n will be participants in the conference call. In step 212, scheduling server program 122 generates an invitation for each conference call participant specified in conference call prompt. For example, scheduling server program 122 generates an invitation for the invitees, and optionally also for the host (i.e., for subsequent handling of updates at the host's computer 116). In step 214, scheduling server program 122 attempts to determine the locations of the conference call participants. For each participant, if a location is not determined in decision 216, then in step 218 scheduling server program 122 determines an appropriate alternative call-in number. However, if a location is determined in decision 216, then in step 220 scheduling server program 122 looks up a suitable location-based dial-in number in contact data 126.

Either way, in step 222, scheduling server program 122 inserts the determined call-in number in a participant's invitation, and in step 224, scheduling server program 122 transmits each invitation to a participant. In decision 226, scheduling server program 122 decides whether redetermination of the location of a participant is necessary. For example, redetermination can occur periodically, or just prior to the scheduled conference call. If redetermination is necessary, then flowchart 200 returns to step 214 to redetermine the location of one or more participants. However, if redetermination is not necessary in step 226, then in step 228, scheduling server program 122 validates the dial-in numbers of each participant just prior to the conference call. After step 228, the scheduled date and time for the conference call arrives, and participants dial in to the conference call.

Figure 3:
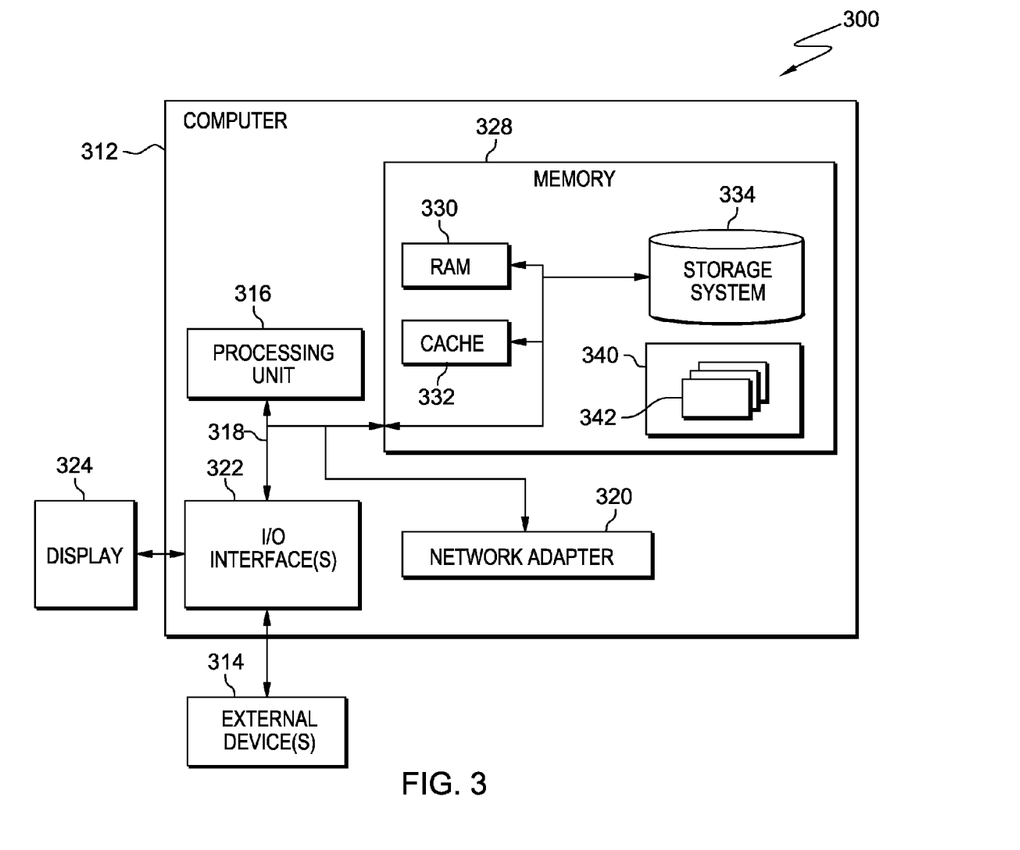
FIG. 3 is a block diagram of a computer system in accordance with an embodiment of the present invention.

Referring now to FIG. 3, a block diagram of a computer system in accordance with an embodiment of the present invention is shown. Computer system 300 is only one example of a suitable computer system and is not intended to suggest any limitation as to the scope of use or functionality of embodiments of the invention described herein. Regardless, computer system 300 is capable of being implemented and/or performing any of the functionality set forth hereinabove.

In computer system 300 there is computer 312, which is operational with numerous other general purpose or special purpose computing system environments or configurations. Examples of well-known computing systems, environments, and/or configurations that may be suitable for use with computer 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of computers 116 and conference server 120 can include or can be implemented as an instance of computer 312.

Computer 312 may be described in the general context of computer system executable instructions, such as program modules, being executed by a computer system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 3, computer 312 in computer system 300 is shown in the form of a general-purpose computing device. The components of computer 312 may include, but are not limited to, one or more processors or processing units 316, memory 328, and bus 318 that couples various system components including memory 328 to processing unit 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 312 typically includes a variety of computer system readable media. Such media may be any available media that is accessible by computer 312, and includes both volatile and non-volatile media, and removable and non-removable media.

Memory 328 can include computer system readable media in the form of volatile memory, such as random access memory (RAM) 330 and/or cache 332. Computer 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program 340, having one or more program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. Scheduling server program 122 can be implemented as or can be an instance of program 340.

Computer 312 may also communicate with one or more external devices 314 such as a keyboard, a pointing device, etc., as well as display 324; one or more devices that enable a user to interact with computer 312; and/or any devices (e.g., network card, modem, etc.) that enable computer 312 to communicate with one or more other computing devices. Such communication can occur via Input/Output (I/O) interfaces 322. Still yet, computer 312 can communicate with one or more networks such as a local area network (LAN), a general wide area network (WAN), and/or a public network (e.g., the Internet) via network adapter 320. As depicted, network adapter 320 communicates with the other components of computer 312 via bus 318. It should be understood that although not shown, other hardware and/or software components could be used in conjunction with computer 312. Examples, include, but are not limited to: microcode, device drivers, redundant processing units, external disk drive arrays, RAID systems, tape drives, and data archival storage systems, etc.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of providing dial-in numbers for participants of conference calls, the method comprising:
   identifying, by one or more processors, a first participant of a conference call;
   determining, by one or more processors, a first geographic location of the first participant;
   responsive to determining the first geographic location, determining, by one or more processors, a first location-based dial-in number for the first participant;
   identifying, by one or more processors, a second participant of the conference call;
   determining, by one or more processors, a second geographic location of the second participant;
   responsive to determining the second geographic location, determining, by one or more processors, a second location-based dial-in number for the second participant, wherein the first location-based dial-in number is different than the second location-based dial-in number, and wherein determining at least one of the first geographic location and the second geographic location occurs in a window of time ending before the start time of the conference call; and
   transmitting, by one or more processors, both the first location-based dial-in number to the first participant and the second location-based dial-in number to the second participant.

2. The method of claim 1, wherein the determining at least one of the first geographic location and second geographic location includes identifying a geographic location of a scheduled event on a calendar of the first participant or the second participant, wherein the scheduled event is an event other than the conference call, and wherein the scheduled event is scheduled on or around the date and time for the conference call.

3. The method of claim 1, wherein the determining at least one of the first geographic location or the second geographic location includes determining the location based on attributes derived from a location service enabled application or device associated with at least one of the first participant and second participant.

4. The method of claim 1, further comprising:
   determining, by one or more processors, that the geographic location of at least one of the first participant and the second participant does not match a geographic location property of a current dial-in number, and
   re-determining the location-based dial-in number for at least one of the first participant and the second participant.

5. The method of claim 1, wherein the transmitting at least one of the first location-based dial-in number and the second location-based dial-in number includes transmitting an invitation to the conference call to an invitee of the conference call.

6. The method of claim 1, further comprising bringing at least one of the first location-based dial-in number and second location-based dial-in number to the attention of at least one of the first participant and the second participant by highlighting, bolding, isolating, or styling at least one of the first location-based dial-in number and the second location-based dial-in number.

7. The method of claim 1, wherein each of the first location-based dial-in number and the second location-based dial-in number comprise a local area code.

8. A computer program product for providing dial-in numbers for participants of conference calls, the computer program product comprising:
one or more computer-readable tangible storage devices and program instructions stored on at least one of the one or more storage devices, the program instructions comprising:
program instructions to identify a first participant of a conference call;
program instructions to determine a first geographic location of the first participant;
program instructions to, responsive to determining the first geographic location, determine a first location-based dial-in number for the first participant;
program instructions to, responsive to failing to determine the first geographic location, determine an alternative dial-in number for the first participant;
program instructions to identify a second participant of the conference call;
program instructions to determine a second geographic location corresponding to the second participant;
program instructions to, responsive to determining the second geographic location, determine a second location-based dial-in number for the second participant, wherein the first location-based dial-in number is different than the second location-based dial-in number, and wherein determining at least one of the first geographic location and the second geographic location occurs in a window of time ending before the start time of the conference call;
program instructions to, responsive to failing to determine the second geographic location, determine an alternative dial-in number for the second participant; and
program instructions to transmit both the first location-based dial-in number to the first participant and the second location-based dial-in number to the second participant.

9. The computer program product of claim 8, wherein the determining at least one of the first geographic location and second geographic location includes identifying a geographic location of a scheduled event on a calendar of the first participant or the second participant, wherein the scheduled event is an event other than the conference call, and wherein the scheduled event is scheduled on or around the date and time for the conference call.

10. The computer program product of claim 8, wherein determining at least one of the first geographic location and the second geographic location includes determining the geographic location based on attributes derived from a location service enabled application or device associated with at least one of the first participant and the second participant.

11. The computer program product of claim 8, further comprising:
program instructions to determine that the geographic location of at least one of the first participant and the second participant does not match a geographic location property of a current dial-in number, and
program instructions to re-determine the location-based dial-in number for at least one of the first participant and the second participant.

12. The computer program product of claim 8, wherein the transmitting at least one of the first location-based dial-in number and the second location-based dial-in number includes transmitting an invitation to the conference call to an invitee of the conference call.

13. A system for providing dial-in numbers for participants of conference calls, the system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, the program instructions comprising:
program instructions to identify a first participant of a conference call;
program instructions to determine a first geographic location of the first participant;
program instructions to, responsive to determining the first geographic location, determine a first location-based dial-in number for the first participant;
program instructions to, responsive to failing to determine the first geographic location, determine an alternative dial-in number for the first participant;
program instructions to identify a second participant of the conference call;
program instructions to determine a second geographic location of the second participant;
program instructions to, responsive to determining the second geographic location, determine a second location-based dial-in number for the second participant, wherein the first location-based dial-in number is different than the second location-based dial-in number, and wherein determining at least one of the first geographic location and the second geographic location occurs in a window of time ending before the start time of the conference call;
program instructions to, responsive to failing to determine the second geographic location, determine an alternative dial-in number for the second participant; and
program instructions to transmit both the first location-based dial-in number to the first participant and the second location-based dial-in number to the second participant.

14. The system of claim 13, wherein the determining at least one of the first geographic location and second geographic location includes identifying a geographic location of a scheduled event on a calendar of the first participant or the second participant, wherein the scheduled event is an event other than the conference call, and wherein the scheduled event is scheduled on or around the date and time for the conference call.

15. The system of claim 13, wherein determining at least one of the first geographic location and the second geographic location includes determining the location based on attributes derived from a location service enabled application or device associated with at least one of the first participant and the second participant.

16. The system of claim 13, further comprising:
program instructions to determine that the geographic location of at least one of the first participant and the second participant does not match a geographic location of a current dial-in number, and program instructions to re-determine the location-based dial-in number for at least one of the first participant and the second participant.

17. The system of claim 13, wherein the transmitting at least one of the first location-based dial-in number and the second location-based dial-in number includes transmitting an invitation to the conference call to an invitee of the conference call.

* * * * *